United States Patent
Wei et al.

(10) Patent No.: US 9,716,560 B2
(45) Date of Patent: Jul. 25, 2017

(54) WIRELESS RECEIVING DEVICE AND SIGNAL PROCESSING METHOD THEREOF

(71) Applicant: MStar Semiconductor, Inc., Hsinchu Hsien (TW)

(72) Inventors: Fong-Shih Wei, Zhubei (TW); Jen-Hsing Wang, Zhubei (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 0 days.

(21) Appl. No.: 15/007,619

(22) Filed: Jan. 27, 2016

(65) Prior Publication Data
US 2016/0226533 A1    Aug. 4, 2016

(30) Foreign Application Priority Data
Feb. 4, 2015   (TW) .............................. 104103708 A

(51) Int. Cl.
| H03H 7/30 | (2006.01) |
| H04H 20/33 | (2008.01) |
| H04B 1/10 | (2006.01) |
| H04W 24/00 | (2009.01) |
| H04L 25/02 | (2006.01) |
| H04L 27/26 | (2006.01) |

(52) U.S. Cl.
CPC .......... *H04H 20/33* (2013.01); *H04B 1/1027* (2013.01); *H04B 1/1081* (2013.01); *H04L 25/0212* (2013.01); *H04W 24/00* (2013.01); *H04L 27/2647* (2013.01)

(58) Field of Classification Search
CPC ...................................... H04H 20/33
USPC ........................................................... 375/233
See application file for complete search history.

(56) References Cited

U.S. PATENT DOCUMENTS

| 2007/0237244 A1* | 10/2007 | Huang .................. H04L 25/022 375/260 |
| 2009/0296800 A1* | 12/2009 | Tseng .................. H04L 27/2647 375/232 |
| 2011/0058597 A1* | 3/2011 | Huckett .............. H04L 25/0216 375/232 |
| 2012/0057628 A1* | 3/2012 | Ancora ............. H04L 25/03248 375/233 |
| 2013/0279558 A1* | 10/2013 | Tang .................. H04L 27/2649 375/232 |

\* cited by examiner

*Primary Examiner* — Lihong Yu
(74) *Attorney, Agent, or Firm* — Edell, Shapiro & Finnan, LLC

(57) ABSTRACT

A wireless receiving device includes: a time-domain channel estimation circuit, generating channel information in the time domain according to a part of a received signal; a fast Fourier transform (FFT) circuit, coupled to the time-domain channel estimation circuit, transforming another part of the received signal and the channel information to the frequency domain to generate a plurality of sets of received data; an equalizer, coupled to the FFT circuit, adjusting the received data to generate a plurality of sets of complex equalized data; an adjusting unit, coupled to the equalizer, adjusting the sets of complex equalized data such that the sets of adjusted equalized data is closer to the origin of a complex plane; and a decision circuit, generating a plurality of sets of binary data according to the sets of adjusted equalized data.

12 Claims, 9 Drawing Sheets

WIRELESS RECEIVING DEVICE AND SIGNAL PROCESSING METHOD THEREOF

This application claims the benefit of Taiwan application Serial No. 104103708, filed Feb. 4, 2015, the subject matter of which is incorporated herein by reference.

BACKGROUND OF THE INVENTION

Field of the Invention

The invention relates in general to a wireless receiving device, and more particularly to a decision feedback channel estimation circuit and a signal processing method of a wireless receiving device, and a channel estimation method based on decision feedback.

Description of the Related Art

Digital Terrestrial Multimedia Broadcasting (DTMB) may be categorized into a single-carrier mode or a multi-carrier mode. DTMB in the multi-carrier mode is based on transmission specifications of time-domain synchronous (TDS) orthogonal frequency division multiplexing (OFDM). One data frame of a DTMB signal includes a frame header and a frame body. The frame header includes a pseudo noise (PN) sequence that may be applied for channel estimation and signal synchronization in the time domain.

FIG. 1 shows a functional block diagram of a conventional DTMB signal receiver. A received signal received via an antenna is converted into a digital format by an analog-to-digital converter (ADC) 110, processed by an auto-gain control (ADC) circuit 120 to adjust its gain, and down-converted by a mixing circuit 130, and then undergoes channel estimation performed by a time-domain channel estimation circuit 140 in the time domain according to decision feedback information and the frame header of a data frame. The estimated channel information and the frame body of the data frame are transformed to the frequency domain by a fast Fourier transform (FFT) circuit 150. The frame body is processed by an equalizer 160 according to the channel information to reduce multipath channel interference and to generate a plurality of sets of equalized data. The equalized data is converted to binary data by a decision circuit 170, and demodulated, decoded and de-interleaved by a back-end processing circuit 190 to obtain a transmission stream. For example, the decision circuit 170 may be a hard decision circuit or a soft decision circuit. In general, the time-domain channel estimation circuit 140 usually calculates a low density parity check (LDPC) code by an iteration method based on a least mean square (LMS) algorithm. Thus, the above binary data is further transformed to the time domain by an inverse fast Fourier transform (IFFT) circuit 180 to serve as decision feedback information that the time-domain channel estimation circuit 140 requires for the subsequent iteration operation on the data frame.

An equation below represents received data $R_{n,k}$ (corresponding to the $k^{th}$ subcarrier of the $n^{th}$ symbol) outputted from the FFT circuit 150:

$$R_{n,k} = |H_{n,k}| \cdot X_{n,k} \cdot e^{j\theta_{n,k}} + N_{n,k} \tag{1}$$

In equation (1), $X_{n,k}$ is transmitted data of the $k^{th}$ subcarrier of the $n^{th}$ symbol, $H_{n,k}$ is the channel gain of the $k^{th}$ subcarrier of the $n^{th}$ symbol, and $N_{n,k}$ is the additive white Gaussian noise (AWGN) of $k^{th}$ subcarrier of the $n^{th}$ symbol.

The equalizer 160 divides the received data $R_{n,k}$ by the channel gain $H_{n,k}$ to obtain equalized data $\hat{X}_{n,k}$:

$$\hat{X}_{n,k} = \frac{R_{n,k}}{H_{n,k}} = (|H_{n,k}| \cdot |X_{n,k}| \cdot e^{j\theta_{n,k}} + N_{n,k})/H_{n,k} \tag{2}$$

The above channel may be a common multipath channel having a channel impulse response (CIR) as shown in FIG. 2A. However, the above channel may also be a 0-dB echo channel having a CIR as shown in FIG. 2B. The amounts of energy of the two channels are substantially equal, and may thus have similar channel responses. The channel response corresponding to the CIR in FIG. 2B contains periodical notches having the channel gain $H_{n,k}$ in extremely small values, such that the noise component ($N_{n,k}$) in equation (2) is amplified, hence affecting the accuracy of the equalized data $\hat{X}_{n,k}$. The number of the notches gets larger as the length of the channel gets longer, and the probability of equalized data $\hat{X}_{n,k}$ being affected by the noise also is increased. FIG. 3 shows a schematic diagram of a position of the equalized data $\hat{X}_{n,k}$ on a constellation diagram. In FIG. 3, 16 quadrature amplitude modulation (16 QAM) is taken as an example, dotted circles represent positions of constellation points, and a solid circle 310 represents the position of the equalized data $\hat{X}_{n,k}$ on the constellation diagram. It is known from equation (2) that, when the received data $R_{n,k}$ outputted by the FFT circuit 150 is divided by the channel gain $H_{n,k}$ having an extremely small value, the value of the equalized data $\hat{X}_{n,k}$ is increased, i.e., the position of the equalized data $\hat{X}_{n,k}$ on the constellation diagram is caused to get further away from the origin of the constellation diagram. Thus, the equalized data $\hat{X}_{n,k}$ that may originally be determined as the constellation point 320 (e.g., at the position of the solid circle 340) may be erroneously determined as a constellation point 330 by the decision circuit 170 as the equalized data $\hat{X}_{n,k}$ is shifted to the position of the solid circle 310. As the amount of such type of erroneous data increases, the time-domain channel estimation circuit 140 may fail to effectively perform channel estimation according to the feedback information of the IFFT circuit 180, in a way that the performance of the receiving circuit is degraded or even the accuracy of the overall received data is reduced.

SUMMARY OF THE INVENTION

The invention is directed to a wireless receiving device and a signal processing method thereof, and a decision feedback channel estimation circuit and a channel estimation method based on decision feedback of a wireless receiving device, so as to increase the accuracy of received data of the wireless receiving device and to enhance the performance of decision feedback channel estimation.

A wireless receiving device disclosed by the present invention includes: a time-domain channel estimation circuit, generating channel information in the time domain according to a part of a received signal; a fast Fourier transform (FFT) circuit, coupled to the time-domain channel estimation circuit, transforming another part of the received signal and the channel information to the frequency domain to generate a plurality of sets of received data; an equalizer, coupled to the FFT circuit, adjusting the received data to generate a plurality of sets of complex equalized data; an adjusting unit, coupled to the equalizer, adjusting the sets of complex equalized data such that the sets of adjusted complex equalized data is closer to the origin of a complex plane; and a decision circuit, generating a plurality of sets of binary data according to the sets of adjusted complex equalized data.

A signal processing method for a wireless receiving device disclosed by the present invention includes: generating channel information in the time domain according to a part of a received data; transforming another part of the received signal and the channel information to the frequency domain to generate a plurality of sets of received data; adjusting the received data to generate a plurality of sets of complex equalized data; adjusting the sets of complex equalized data such that the sets of adjusted complex equalized data is closer to an origin of a complex plane; and generating a plurality of binary data according to the sets of adjusted complex equalized data.

The wireless receiving device and the signal processing method thereof, and the decision feedback channel estimation circuit and the channel estimation method based on decision feedback of a wireless receiving device, are capable of increasing the accuracy of received data of the wireless receiving device and enhancing the performance of decision feedback channel estimation. Compared to the prior art, the present invention appropriately adjusts equalized data to reduce the effect that the noise has on signals during a transmission process. The adjusted data has a more even distribution on the constellation diagram, and so more accurate data can be obtained after a decision mechanism and the performance of decision feedback channel estimation can be enhanced.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definition of the terms are based on the description or explanation of the application.

Figure 4A:
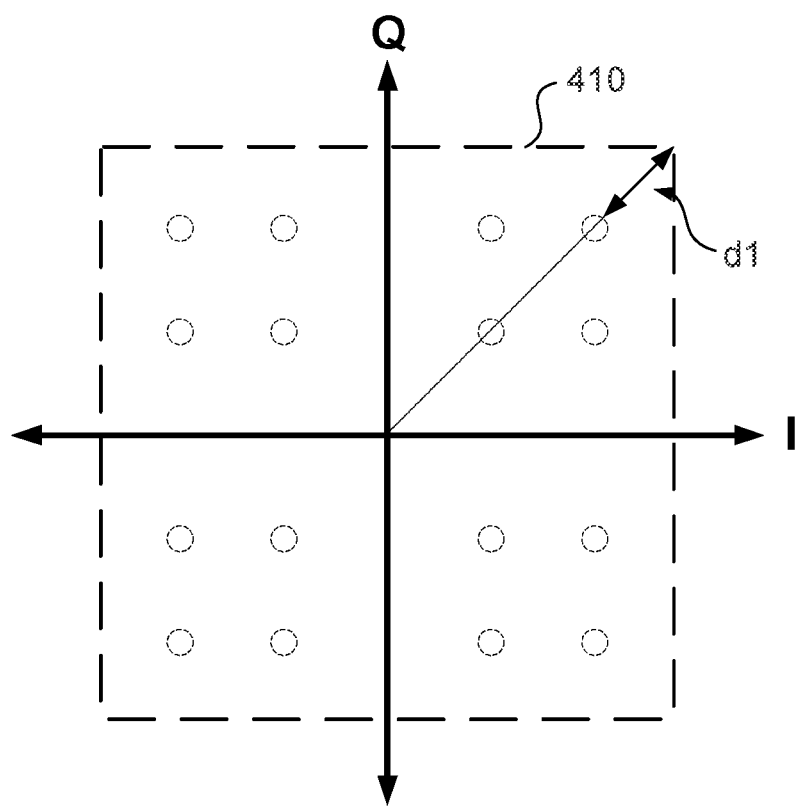
FIG. 4A is a 16QAM constellation diagram and corresponding borders.
Figure 4B:
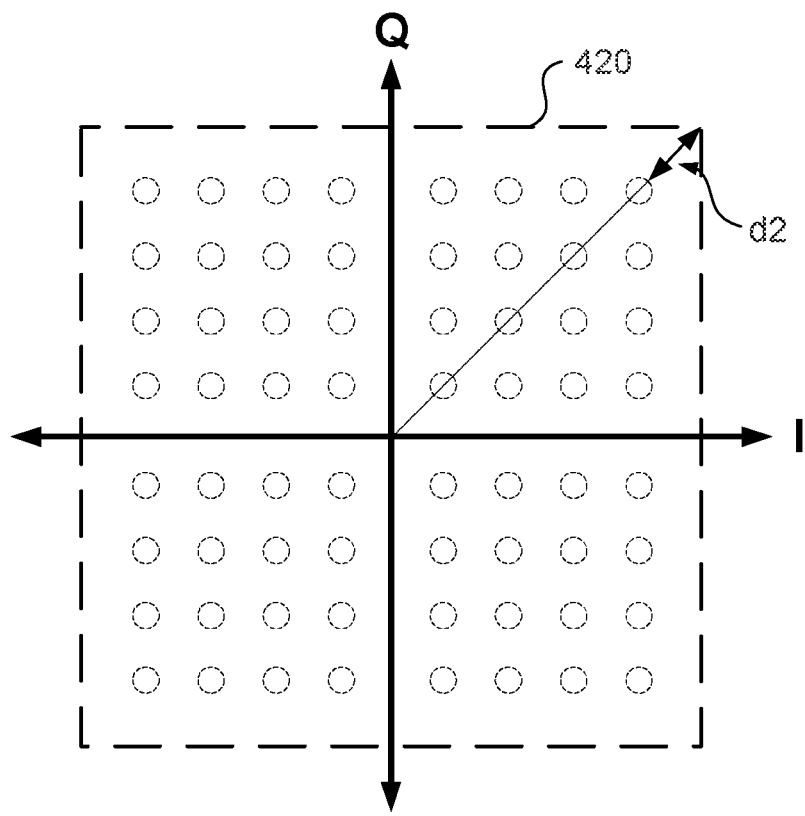
FIG. 4B is a 16QAM constellation diagram and corresponding borders.

It is an object of the present invention to appropriately adjust equalized data that is severely affected by a channel, such that the adjusted equalized signal is located at a more appropriate position on a constellation diagram. The so-called "more appropriate position" refers to a position that is within a predetermined range on the constellation diagram, and borders of the range are spaced from an edge of a constellation point by a predetermined distance. As shown in the 16QAM constellation diagram in FIG. 4A, a distance d1 is present between a border 410 and an outer constellation point. As shown in the 16 QAM constellation diagram in FIG. 4B, a distance d2 is present between a border 420 and an outer constellation point. Settings of the border 410 and the border 420 as well as the modulation method (e.g., 16QAM, 64QAM, 256QAM . . . ) are associated with a channel length. When the adjusted data $\hat{X}_{n,k}$ is located at a more appropriate position (i.e., within a range defined by the border 410 and the border 420 for instance), the decision result of the decision circuit 170 is more evenly distributed at the constellation points. Such result is closer to the setting of a transmitting end, i.e., transmitted data is more evenly modulated on the constellation points and then transmitted. Thus, the time-domain channel estimation circuit 140 is allowed to obtain more accurate feedback information to more efficiently complete the iteration operation for channel estimation.

Figure 1:
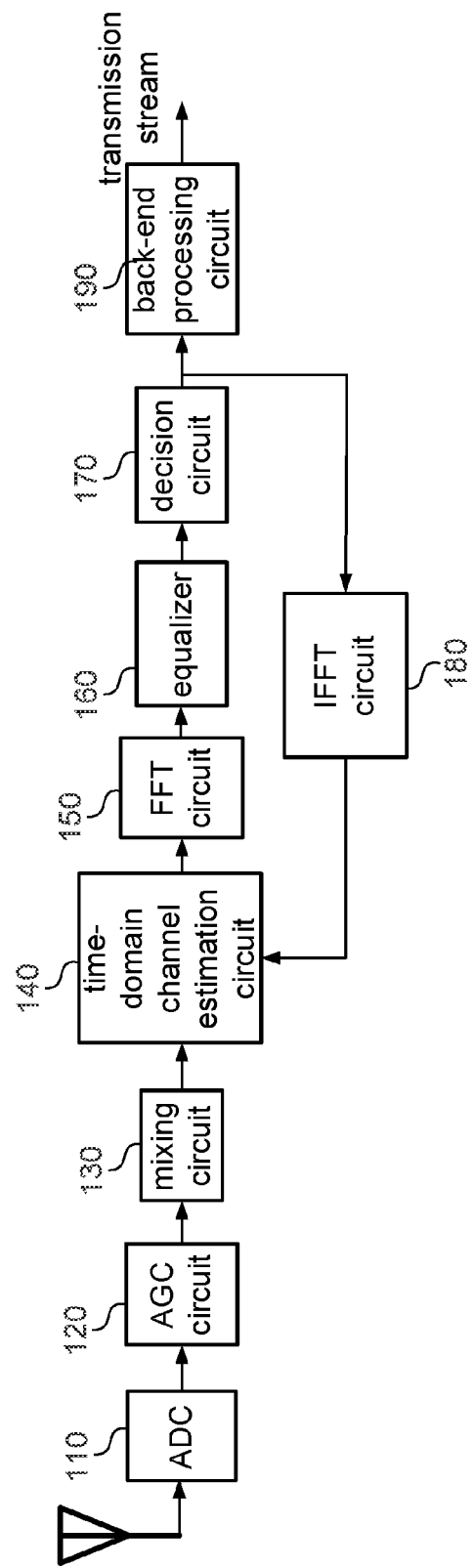
FIG. 1 is a functional block diagram of a conventional Digital Terrestrial Multimedia Broadcasting (DTMB) signal receiver.
Figure 5:
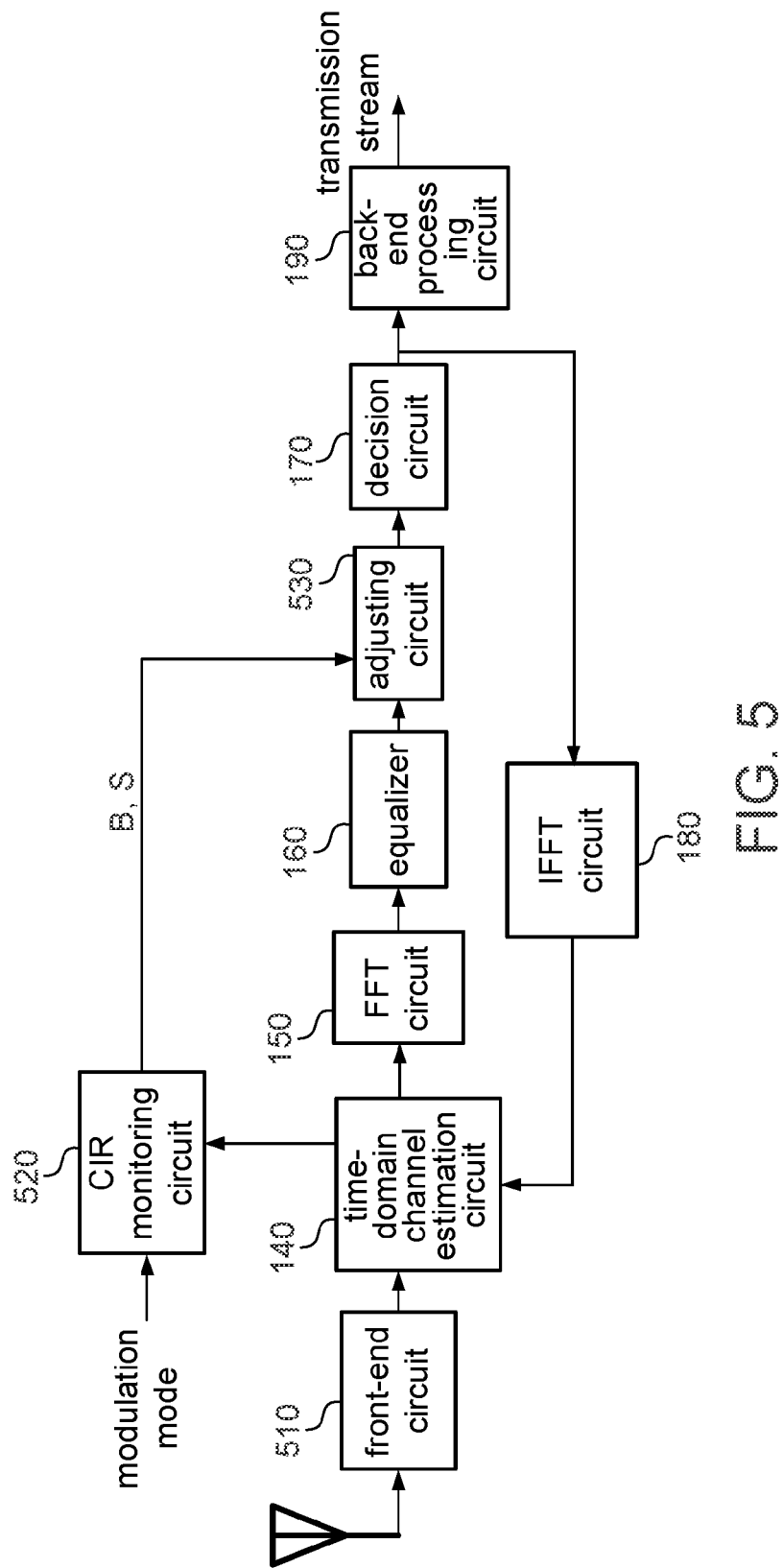
FIG. 5 is a functional block diagram of a DTMB signal receiver according to an embodiment of the present invention.

FIG. 5 shows a functional block diagram of a Digital Terrestrial Multimedia Broadcasting (DTMB) signal receiver according to an embodiment of the present invention. The ADC 110, the AGC circuit 120 and the mixing circuit 130 in FIG. 1 are collectively represented by a front-end circuit 510. The DTMB signal receiver of the present invention further includes a channel impulse response (CIR) monitoring unit 520 coupled to the time-domain channel estimation circuit 140, and an adjusting unit 530 coupled between the equalizer 160 and the decision circuit 170. According to the channel information obtained by the time-domain channel estimation circuit 140, e.g., channel length and channel power, and with reference to the modulation mode (e.g., 16QAM, 64QAM, 256QAM . . . ) utilized by the currently received DTMB signal, the CIR monitoring unit 520 obtains a border value B and an adjustment coefficient S through a look-up table (LUT). The adjusting unit 530 compares the equalized data $\hat{X}_{n,k}$ with the border value B to determine whether to adjust the equalized data $\hat{X}_{n,k}$. For example, when the equalized data $\hat{X}_{n,k}$ is located outside the border, it means that the equalized data $\hat{X}_{n,k}$ is severely affected by the channel. At this point, the adjusting unit 530 adjusts the equalized data $\hat{X}_{n,k}$ according to the adjustment coefficient S. A shift amount of the equalized data $\hat{X}_{n,k}$ before and after the adjustment is proportional to the adjustment coefficient S, and the equalized signal $\hat{X}_{n,k}$ after the adjustment is located within the border. On the other hand, if the equalized data $\hat{X}_{n,k}$ outputted by the equalizer 160 is already located within the border, without adjusting the equalized data $\hat{X}_{n,k}$, the adjusting unit 530 directly outputs the equalized data $\hat{X}_{n,k}$ to the back-end processing circuit 190 and the IFFT circuit 180.

Figure 2A:
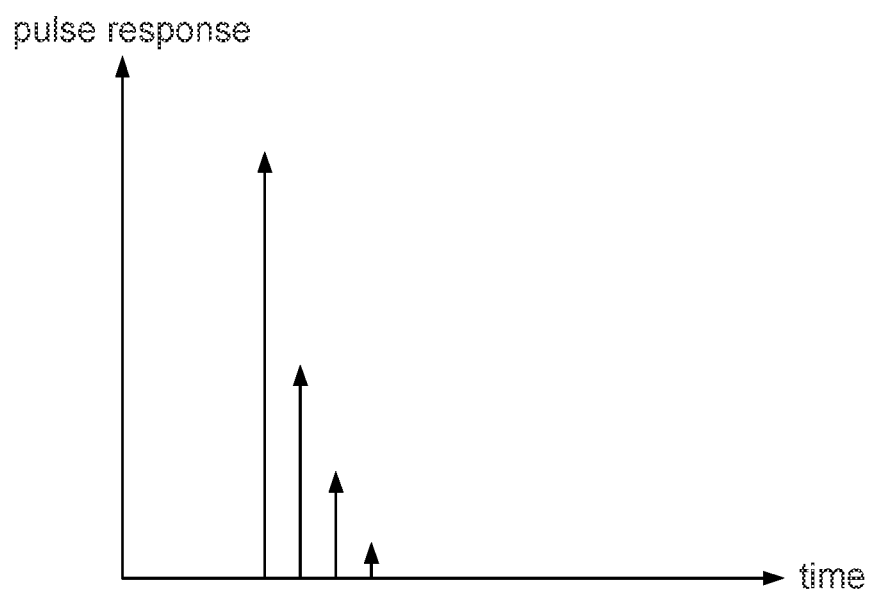
FIG. 2A is a schematic diagram of a channel impulse response (CIR) of a common multipath channel.
Figure 2B:
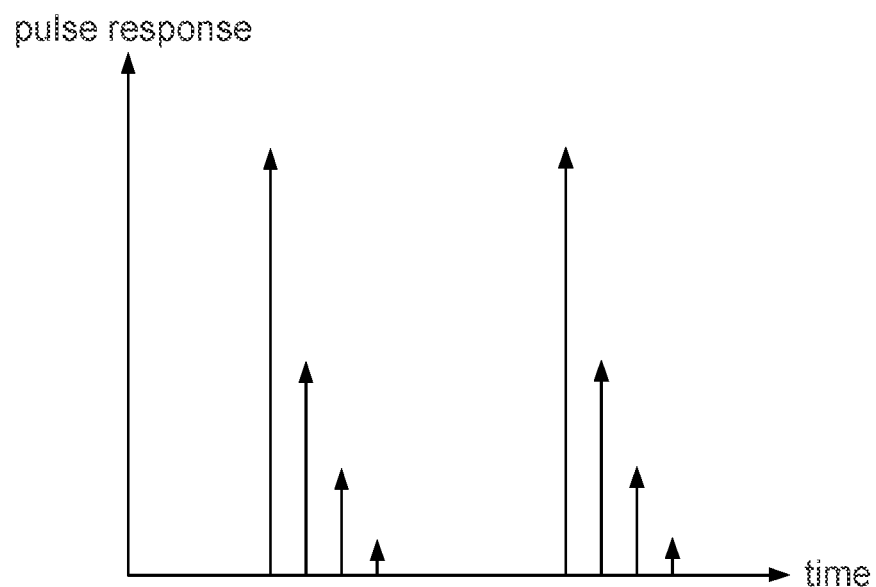
FIG. 2B is a schematic diagram of a CIR of a 0-dB echo channel.

As previously stated, the number of notches occurring in the diagram of the CIR gets larger as the channel length gets longer. The probability of an error occurring in the equalized data $\hat{X}_{n,k}$ also increases as the number of notches gets larger, meaning that the probability of the equalized data $\hat{X}_{n,k}$ deviating from the origin of a constellation diagram also gets higher. At this point, there is a need for the adjusting unit 530 to cause the equalized data $\hat{X}_{n,k}$ to be closer to the origin of the constellation diagram by the adjustment process. That is to say, under the same modulation mode, for a longer channel length, the CIR monitoring unit 520 needs to output a smaller border value B to reduce a predetermined range defined on the constellation diagram based on such condition. Thus, the amount of equalized data $\hat{X}_{n,k}$ adjusted by the adjusting unit 530 gets larger. On the contrary, for a shorter channel length, a larger border value B needs to be outputted. When the adjustment coefficient S is determined, the CIR monitoring unit 520 refers to the modulation mode and channel information. In response to different modulation modes, the CIR monitoring unit 520 is predetermined with different adjustment coefficients S, which may be further fine-tuned according to the channel energy. When the channel energy of a multipath channel is closer to 1 (i.e., the channel is closer to the 0-dB echo channel in FIG. 2B), multipath conditions are more severe, and the depth of notches of CIR is deeper, hence resulting in more aggravated deviation of the equalized data $\hat{X}_{n,k}$ from the origin of the constellation diagram. At this point, the adjustment amount by which the adjusting unit 530 adjusts the equalized data $\hat{X}_{n,k}$ towards the origin is larger. However, when multipath conditions are present and an energy ratio of the multipath channel differs from 1 significantly, i.e., when an energy difference between two sets of channels is greater, the depth of notches of CIR is shallower. That is, the channel gain $H_{n,k}$ of the notches is not substantially 0, and so the equalized data $\hat{X}_{n,k}$ deviates from the origin less noticeably. At this point, the adjusting unit 530 lowers the adjustment amount for adjusting the equalized data $\hat{X}_{n,k}$ towards the origin. In one embodiment, the LUT that records the border value B and the adjustment coefficient S is established through simulation. For example, the modulation mode is first determined, and a channel combination (the channel length and the channel energy) is determined to identify the border value B and the adjustment coefficient S corresponding to various combinations. The CIR monitoring unit 520 may then obtain the corresponding border value B and adjustment coefficient S according to the modulation mode and the channel information that the time-domain channel estimation circuit 140 transmits. In a preferred embodiment, if the CIR monitoring unit 520 determines that the channel combination does not cause a serious error in the equalized data $\hat{X}_{n,k}$, e.g., the channel is shorter and the energy difference of the multipath channel is larger, the CIR monitoring unit 520 may control the adjusting unit 530 not to perform any determination and adjustment, and to directly transmit the output of the equalizer 160 to the decision circuit 170.

Figure 6:
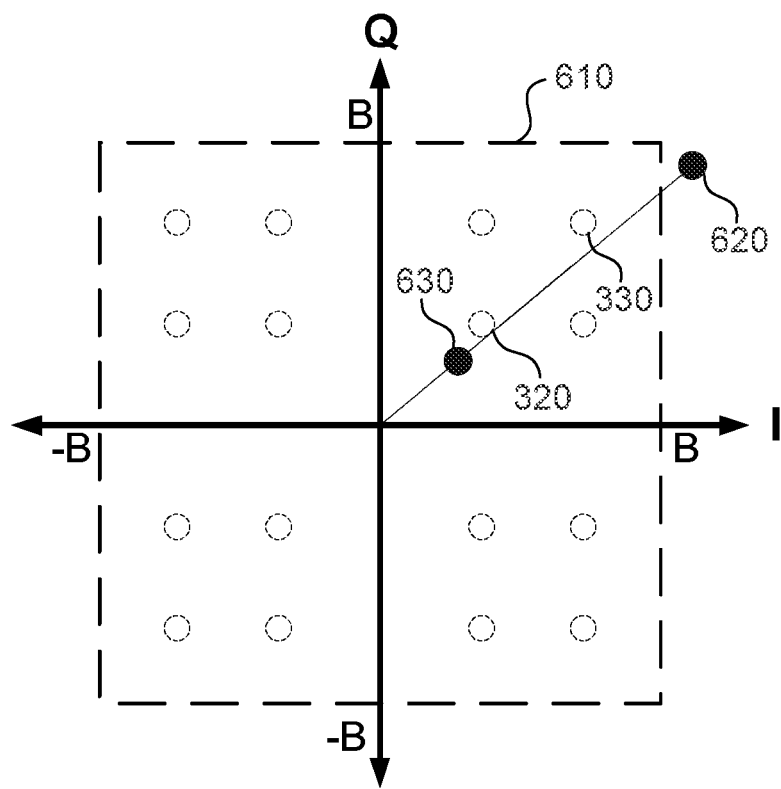
FIG. 6 is a schematic diagram of positions of the equalized data $\hat{X}_{n,k}$ before and after adjustment on a constellation diagram according to an embodiment of the present invention.

The adjusting unit 530 determines whether the equalized data $\hat{X}_{n,k}$ is located within the range that the border value B determines. If the equalized data $\hat{X}_{n,k}$ is located within the range that the border value B determines, the adjusting unit 530 does not multiply the equalized data $\hat{X}_{n,k}$ by the adjustment coefficient S; that is, the decision circuit 170 performs a decision according to the original equalized data. Conversely, if the equalized data $\hat{X}_{n,k}$ is located outside the range that the border value B determines, the adjusting unit 530 multiplies the equalized data $\hat{X}_{n,k}$ by the adjustment coefficient S, such that the adjusted equalized signal $\hat{X}_{n,k}$ is located within the range that the border value B determines. It should be noted that, the border value B may be set to an extremely small value, or may be set to 0. At this point, all equalized data $\hat{X}_{n,k}$ falls outside the range that the border value B determines, which is equivalent not setting the border value B at all and directly adjusting all of the equalized data $\hat{X}_{n,k}$ by the adjusting unit 530. While the adjusting unit 530 multiples the equalized data $\hat{X}_{n,k}$ by the adjustment coefficient S, the adjusting unit 530 also multiplies a real part (I-part) and an imaginary part (Q-part) of the equalized data $\hat{X}_{n,k}$ by the adjustment coefficient S. In other words, the adjusting unit 530 changes only the size but not the phase of the equalized data $\hat{X}_{n,k}$. That is, a connecting line between the position of the equalized data $\hat{X}_{n,k}$ after the adjustment and the position of the equalized data $\hat{X}_{n,k}$ before the adjustment passes through the origin of the constellation diagram, and the adjustment coefficient S is a positive number between 0 and 1. FIG. 6 shows a schematic diagram of positions of the equalized data $\hat{X}_{n,k}$ before and after the adjustment on the constellation diagram. The equalized data $\hat{X}_{n,k}$ before the adjustment is located at a position of a solid circle 620 in the diagram, and a border 610 is determined according to the border value B. The adjusting unit 530 first determines whether the equalized data $\hat{X}_{n,k}$ before the adjustment is located outside the range that the border 610 determines. To perform such determination, an absolute value of the real part (i.e., the size of the component of the real part) and an absolute value of an imaginary part (i.e., the size of the component of the imaginary part) are respectively compared with the border value B. If any of the two is larger than the border value B, it means that the equalized data $\hat{X}_{n,k}$ before the adjustment is located outside the range that the border 610 determines, or else is within the range that the border 610 determines. If the equalized data $\hat{X}_{n,k}$ before the adjustment is located within the range that the border 610 determines, the adjusting unit 530 directly outputs the equalized data $\hat{X}_{n,k}$ to the decision circuit 170 without processing the equalized data $\hat{X}_{n,k}$. However, if the equalized data $\hat{X}_{n,k}$ before the adjustment is located outside the range that the border 610 determines (e.g., the position of a solid circle 620), the adjusting unit 530 multiplies the equalized data $\hat{X}_{n,k}$ by the adjustment coefficient S. Thus, the equalized data $\hat{X}_{n,k}$ after the adjustment may shift to the position of a solid circle 630, and a connecting line between the solid circle 620 and the solid circle 630 passes through the origin of the complex plane. That is to say, although the equalized data $\hat{X}_{n,k}$ before the adjustment may be determined as a constellation point 330 by the decision circuit 170, the decision circuit 170 still determines the equalized data $\hat{X}_{n,k}$ after the adjustment as the constellation point 320 according to a decision mechanism of the decision circuit 170 because the equalized data $\hat{X}_{n,k}$ after the adjustment is located at a more appropriate position.

In conclusion, originally, a large part of the equalized data $\hat{X}_{n,k}$ may fall outside the range that the border 610 determines due to effects of amplified noise, and most of the values outputted by the decision circuit 170 may be determined as few outer points of the constellation points, leading to an uneven distribution and increased data error rate. When the mechanism of the present invention is applied, the equalized data $\hat{X}_{n,k}$ affected by noise may be appropriate adjusted such that the values after the decision may be evenly distributed at the constellation points. Thus, the data accuracy is increased, and the number of subsequent iteration operations performed on data frames is also reduced as the time-domain channel estimation circuit 140 is given with more accurate feedback information. Taking an actual example for illustration, assume that the modulation mode is 64QAM, the code rate is 0.6, the channel is a 0-dB echo channel that includes 393 taps, the border value B is set to 1.5 times of a normalized transmission energy, and the adjustment coefficient S is 0.125. Before introducing the mechanism of the present invention, an average of 7 to 11 iteration operations need to be performed for the time-domain channel estimation circuit 140 to calculate a low density parity check (LDPC) code, and the error rate of the calculated LDPC code is 8.9e-2. In comparison, after introducing the mechanism of the present invention, the number of iteration operations that need to be performed is significantly reduced to 6 to 8 times, and the error rate is improved to 8.4e-2.

Figure 7:
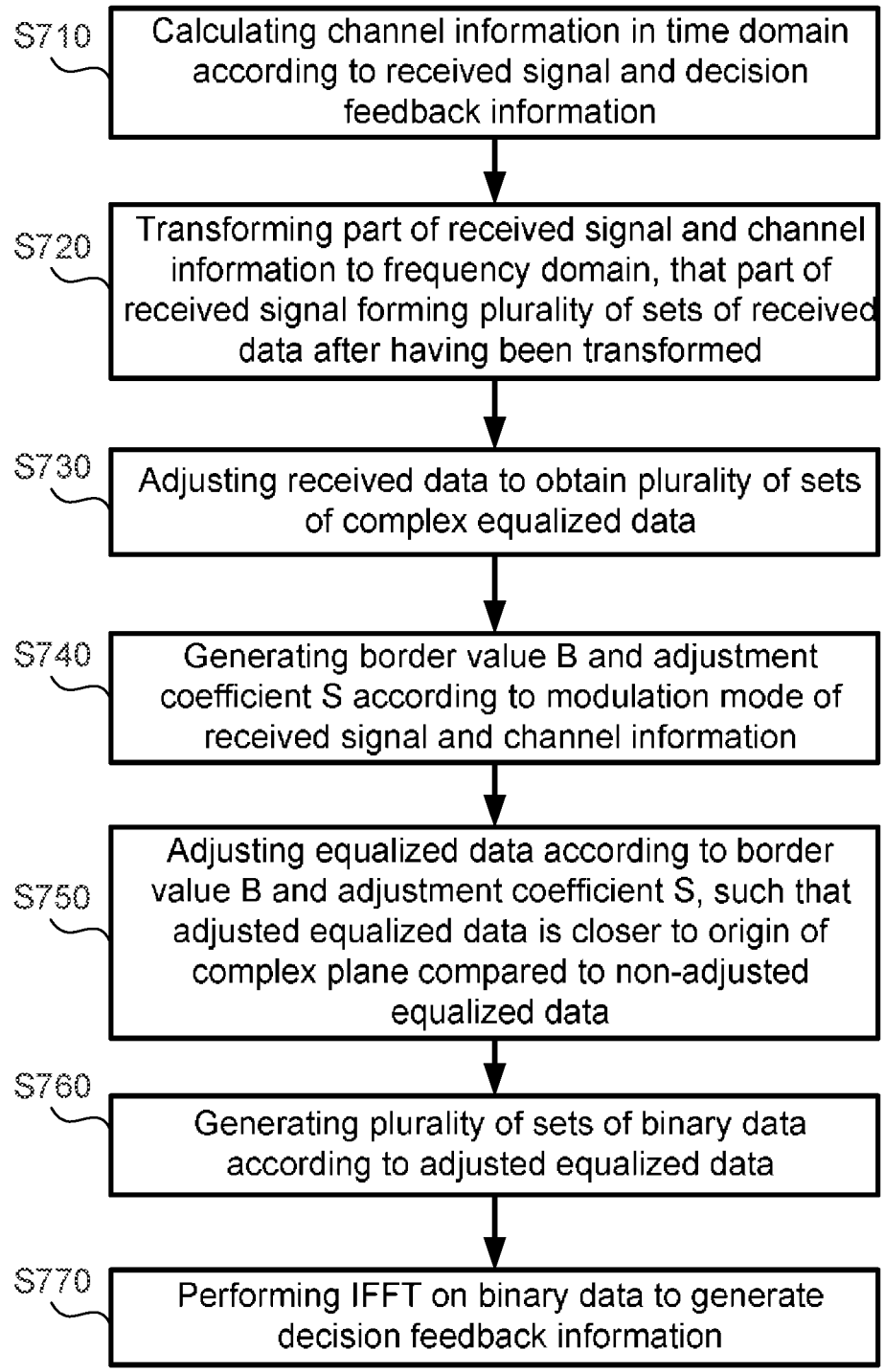
FIG. 7 is a flowchart of a channel estimation method based on decision feedback according to an embodiment of the present invention.

FIG. 7 shows a flowchart of a channel estimation method based on feedback decision according to an embodiment of the present invention. In addition to the foregoing decision feedback channel estimation circuit of a wireless receiving device, the present invention correspondingly discloses a decision feedback channel estimation method applied to a receiving end of DTMB signals to alleviate the effect that a multipath channel has on equalized data. The method may be performed by the DTMB signal receiving shown in FIG. 5 or an equivalent device. As shown in FIG. 7, the decision feedback channel estimation method according to an embodiment includes following steps.

In step S710, channel information is calculated in the time domain according to a received signal and feedback decision information. In this step, the channel information may be calculated by an iteration operation based on a least mean square (LMS) algorithm and with reference to the decision feedback information. For example, the channel information includes information of the channel gain, channel length and channel energy.

In step S720, a part of the received signal and the channel information are transformed to the frequency domain, with the part of the received signal forming a plurality of sets of received data after having been transformed. In this step, the part of the received signal and the channel information are transformed to the frequency domain by FFT, and a plurality of sets of complex received data is formed after the transformation, as shown in equation (1).

In step S730, the complex received data is adjusted to obtain a plurality of sets of equalized data. This step is an equalization step, in which the received data is divided by the channel gain according to the channel information to reduce the interference of the multipath channel and to generate a plurality of sets of equalized data. As shown in equation (2), the equalized data is similarly in a complex form.

In step S740, a border value B and an adjustment coefficient S are generated according to a modulation mode of the received signal and the channel information. In this step, the border value B and the adjustment coefficient S are generated through a look-up table (LUT). Indices used for looking up the LUT are the modulation mode of the received signal, and the channel information including the information of the channel length and channel energy. Most appropriate border value B and adjustment coefficient S are identified in advance for different modulation modes and channel information through simulation.

Figure 3:
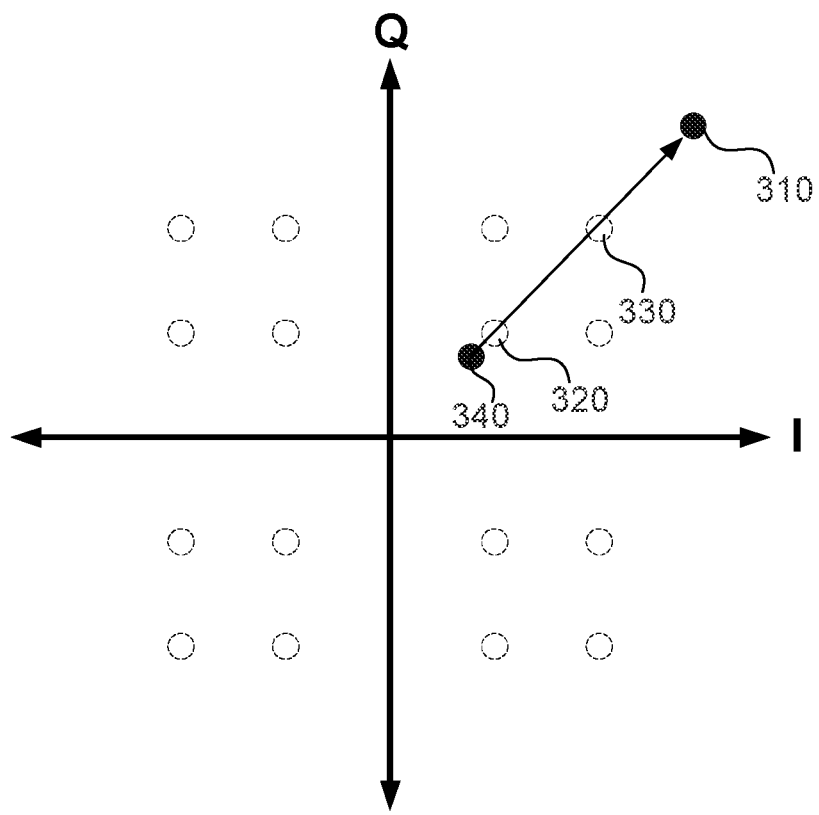
FIG. 3 is a schematic diagram of a position of equalized data $\hat{X}_{n,k}$ on a constellation diagram.

In step S750, the equalized data is adjusted according to the border value B and the adjustment coefficient S, such that the adjusted equalized data is closer to the origin of a complex plane compared to non-adjusted equalized data. As shown in equation (2), the accuracy of the equalized data may be affected due to the amplified noise component obtained from dividing the received data by an extremely channel gain in the equalization step of step S730. As shown in FIG. 3, the equalized data originally located at the solid circle 340 in the constellation diagram may be affected by the amplified noise component and hence shift to the position of the solid circle 310, leading in an incorrect decision result. Thus, in this step, it is determined whether the equalized data is located outside a range that the border determines. If not, the equalized data is not adjusted. If the equalized data is located outside the range that the border determines, the equalized data is multiplied by the adjustment coefficient S, such that the adjusted equalized data is closer to the origin of the complex plane, i.e., falling within the range that the border value B determines. The real part and the imaginary part of the equalized data are at the same time multiplied by the adjustment coefficient S when the equalized data is multiplied by the adjustment coefficient S. Thus, after the adjustment, only the size but not the phase of the adjusted equalized data is changed. The adjustment coefficient S is a positive number between 0 and 1.

In step S760, a plurality of sets of binary data is generated according to the adjusted equalized data. This step is a decision step, in which the equalized data undergoes a decision process after having been adjusted to obtain more accurate binary data.

In step S770, the binary data is transformed by IFFT to generate the decision feedback information. That is, IFFT is performed on the binary data to obtain the decision feedback information needed in step S710. With the decision feedback information fed back, the number of iteration operations required in a subsequent calculation in step S710 can be reduced.

In addition to being applied to decision feedback channel estimation, the core concept of the present invention is also applicable to a wireless receiving device that does not involve decision feedback channel estimation. Under the above circumstance, the DTMB signal receiver in FIG. 5 does not include the IFFT circuit 180, and the present invention nonetheless promotes the decision circuit 170 to output more accurate binary data. The corresponding signal processing method includes the abovementioned step S710 to S760, with however the channel information being generated without considering the decision feedback information in step S710.

One person skilled in the art can understand the implementation details and variations of the method in FIG. 7 based on the disclosure associated with the device in FIG. 5. For brevity, and without affecting the full disclosure and possible implementation of the method of present invention, such repeated details are omitted herein. Although a DTMB signal is taken as an example in the embodiments, such example is not to be construed as a limitation to the present invention. Based on the disclosure of the present invention, one person skilled in the art can appropriately apply the present invention to other types of multi-carrier mode OFDM signals.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A wireless receiving device, comprising:
a time-domain channel estimation circuit, generating channel information in a time domain according to a part of a received signal;
a fast Fourier transform (FFT) circuit, coupled to the time-domain channel estimation circuit, transforming another part of the received signal and the channel information to a frequency domain to generate a plurality of sets of received data;

an equalizer, coupled to the FFT circuit, adjusting the received data to generate a plurality of sets of complex equalized data;

an adjusting unit, coupled to the equalizer, adjusting the sets of complex equalized data such that the sets of adjusted complex equalized data are closer to an origin of a complex plane; and a decision circuit, coupled to the adjusting unit, generating a plurality of sets of binary data according to the sets of adjusted complex equalized data, wherein the adjusting unit determines whether to adjust the sets of complex equalized data according to a first reference value, and adjusts the sets of complex equalized data when one of an absolute value of a real part and an absolute value of an imaginary part of each of the sets of complex equalized data is greater than the first reference value, wherein the adjusting unit simultaneously adjusts the real parts and the imaginary parts of the sets of complex equalized data according to a second reference value; the sets of complex equalized data before and after adjustment have phases that are the same, wherein the channel information comprises a channel length and a channel energy, and wherein the first reference value is inversely proportional to the channel length.

2. The wireless receiving device according to claim 1, wherein the adjusting unit simultaneously multiplies the real parts and the imaginary parts of the set of complex equalized data by the second reference value, and the second reference value is a positive number between 0 and 1.

3. The wireless receiving device according to claim 1, further comprising:
a monitoring unit, coupled to the time-domain channel estimation circuit and the adjusting unit, generating the first reference value and the second reference value according to a modulation mode of the received signal and the channel information.

4. The wireless receiving device according to claim 1, wherein the second reference value is adjusted according to the channel energy.

5. The wireless receiving device according to claim 1, wherein the received signal is a Digital Terrestrial Multimedia Broadcasting (DTMB) signal in a multi carrier mode.

6. The wireless receiving device according to claim 1, further comprising:
an inverse fast Fourier transform (IFFT) circuit, coupled to the decision circuit and the time-domain channel estimation circuit, performing IFFT on the binary data to generate decision feedback information;
wherein, the time-domain channel estimation circuit generates the channel information further according to the decision feedback information.

7. A signal processing method for a wireless receiving device, comprising:
generating channel information in a time domain according to a part of a received signal;
transforming another part of the received signal and the channel information to a frequency domain to generate a plurality of sets of received data;
adjusting the received data to generate a plurality of sets of complex equalized data;
adjusting the sets of complex equalized data such that the sets of adjusted complex equalized data are closer to an origin of a complex plane; and
generating a plurality of sets of binary data according to the sets of adjusted complex equalized data,
wherein the step of adjusting the sets of complex equalized data comprises determining whether to adjust the sets of complex equalized data according to a first reference value, and adjusting the sets of complex equalized data when one of an absolute value of a real part and an absolute value of an imaginary part of each of the sets of complex equalized data is greater than the first reference value,
wherein the step of adjusting the sets of complex equalized data comprises simultaneously adjusting the real parts and the imaginary parts of the sets of complex equalized data according to a second reference value; the sets of complex equalized data before and after adjustment have phases that are the same,
wherein the channel information comprises a channel length and a channel energy, and
wherein the first reference value is inversely proportional to the channel length.

8. The signal processing method for a wireless receiving device according to claim 7, wherein the step of adjusting the sets of complex equalized data comprises simultaneously multiplying the real parts and the imaginary parts of the set of complex equalized data by the second reference value; the second reference value is a positive number between 0 and 1.

9. The signal processing method for a wireless receiving device according to claim 7, further comprising:
generating the first reference value and the second reference value according to a modulation mode of the received signal and the channel information.

10. The signal processing method for a wireless receiving device according to claim 7, wherein the second reference value is adjusted according to the channel energy.

11. The signal processing method for a wireless receiving device according to claim 7, wherein the received signal is a Digital Terrestrial Multimedia Broadcasting (DTMB) signal in a multi-carrier mode.

12. The signal processing method for a wireless receiving device according to claim 7, further comprising:
performing inverse fast Fourier transform (IFFT) on the binary data to generate decision feedback information;
wherein, the step of generating the channel information according to the part of the received signal further comprises:
generating the channel information according to the decision feedback information.

* * * * *